United States Patent
Birdis et al.

(10) Patent No.: US 9,041,523 B1
(45) Date of Patent: May 26, 2015

(54) CAR SEAT OCCUPANCY ALARM

(71) Applicants: Roderick Birdis, Jacksonville, FL (US); Marcita Birdis, Jacksonville, FL (US)

(72) Inventors: Roderick Birdis, Jacksonville, FL (US); Marcita Birdis, Jacksonville, FL (US)

( * ) Notice: Subject to any disclaimer, the term of this patent is extended or adjusted under 35 U.S.C. 154(b) by 0 days.

(21) Appl. No.: 13/874,045

(22) Filed: Apr. 30, 2013

(51) Int. Cl.
*G08B 21/00* (2006.01)
*B60Q 11/00* (2006.01)

(52) U.S. Cl.
CPC ...................................... *B60Q 11/00* (2013.01)

(58) Field of Classification Search
CPC ................................... B60N 2/00; B60N 2/02
USPC ........ 340/425.5, 438, 457, 457.1, 573.1, 666, 340/667; 180/273
See application file for complete search history.

(56) References Cited

U.S. PATENT DOCUMENTS

| | | |
|---|---|---|
| 5,949,340 A | 9/1999 | Rossi |
| 6,812,844 B1 | 11/2004 | Burgess |
| 7,348,889 B2 | 3/2008 | Monzo |
| 7,378,979 B2 | 5/2008 | Rams |
| 7,408,445 B1 | 8/2008 | Cunningham |
| 7,466,217 B1 | 12/2008 | Johnson |
| 2008/0088426 A1 | 4/2008 | Lima |

*Primary Examiner* — Jeffrey Hofsass

(57) ABSTRACT

The car seat occupancy alarm is an alarm that detects the presence of individuals seated in the rear of the vehicle, and upon detection of which shall emit an alarm, provided the vehicle is turned off. The alarm system includes pressure sensors that are integrated into the rear seats of a vehicle, and which are in wired communication with a central processing unit located elsewhere within said vehicle. The central processing unit is further in wired communication with a timer, vehicle lights, and a vehicle battery in order to operate, sense, and emit an alarm upon detection that individuals remain in any of the rear seats while the vehicle is parked.

3 Claims, 4 Drawing Sheets

CAR SEAT OCCUPANCY ALARM

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

A. Field of the Invention

The present invention relates to the field of car seat, more specifically, an alarm system directed to the rear car seats.

B. Discussion of the Prior Art

As will be discussed immediately below, no prior art discloses an alarm system configured for use with a vehicle; wherein the alarm system includes thin metal contact sensors that are integrated into the rear seats of a vehicle, and which are in wired communication with a central processing unit located elsewhere within said vehicle; wherein the contact sensors close a circuit once an individual is seated on the respective seat; wherein the central processing unit is further in wired communication with a timer, vehicle lights, and a vehicle battery in order to operate, sense, and emit an alarm while the vehicle is parked.

The Burgess Patent (U.S. Pat. No. 6,812,844) discloses a child safety seat with an alarm to notify the driver of a vehicle that an infant is in its carrier inside of the vehicle. However, the alarm is not configured for use with the rear seats of a vehicle.

The Johnson et al. Patent (U.S. Pat. No. 7,466,217) discloses a system for determining abandonment of a child in an unattended vehicle. However, the system does not use pressure sensors to detect weight of the rear seat(s).

The Rossi Patent (U.S. Pat. No. 5,949,340) discloses a system for warning when a child is left in a vehicle seat and a transmitter for sending the warning to a remote location. However, the system is integrated into the child car seat, and not the rear seat(s) of the vehicle.

The Cunningham Patent (U.S. Pat. No. 7,408,445) discloses a system for generating a reminder signal to one or more individuals exiting a vehicle for purposes of preventing the inadvertent leaving of a child. Again, the system does not integrate weight or pressure sensors into the rear seat(s) of the vehicle.

The Lima et al. Patent Application Publication (U.S. Pub. No. 2008/0088426) discloses an alarm system for alerting parents that a baby is still in a car seat. However, the alarm system is secured to the restraining belts of a child car seat, and not pressure sensors of rear vehicle seats.

The Rams, Jr. Patent (U.S. Pat. No. 7,378,979) discloses a child occupancy detection system having a sensor connected to the seat belt of the baby's car seat. Again, the system does not include pressure sensors into the reart seat(s) of a vehicle.

The Monzo et al. Patent (U.S. Pat. No. 7,348,889) discloses a system and method to warn that a child has been left unattended in a vehicle. Again, the system is not integrating pressure sensors in the rear seat(s) of a vehicle.

While the above-described devices fulfill their respective and particular objects and requirements, they do not describe an alarm system configured for use with a vehicle; wherein the alarm system includes thin metal contact sensors that are integrated into the rear seats of a vehicle, and which are in wired communication with a central processing unit located elsewhere within said vehicle; wherein the contact sensors close a circuit once an individual is seated on the respective seat; wherein the central processing unit is further in wired communication with a timer, vehicle lights, and a vehicle battery in order to operate, sense, and emit an alarm upon detection that individuals remain in any of the rear seats while the vehicle is parked. In this regard, the car seat occupancy alarm departs from the conventional concepts and designs of the prior art.

SUMMARY OF THE INVENTION

The car seat occupancy alarm is an alarm that detects the presence of individuals seated in the rear of the vehicle, and upon detection of which shall emit an alarm, provided the vehicle is turned off. The alarm system includes contact sensors that are integrated into the rear seats of a vehicle, and which are in wired communication with a central processing unit located elsewhere within said vehicle. The central processing unit is further in wired communication with a timer, vehicle lights, and a vehicle battery in order to operate, sense, and emit an alarm upon detection that individuals remain in any of the rear seats while the vehicle is parked.

It is an object of the invention to provide an alarm that is configured for use with a vehicle, and which detects the presence of individuals seated in the rear seat of the vehicle, and which shall issue an alarm provided the vehicle is turned off.

A further object of the invention is to provide an alarm that uses metal contact sensors that touch upon having a weight placed onto the rear vehicle seat in order to form a circuit that the central processing unit detects.

A further object of the invention is to provide contact sensors on both the seat and seat back of the same rear seat in order to determine whether an individual is seated in the rear seat as opposed to an object that is resting on the seat.

A further object of the invention is to provide an alarm that utilizes the lights of the vehicle in order to issue an alarm.

A further object of the invention is to provide an alarm that utilizes the car horn of the vehicle in order to issue an alarm.

These together with additional objects, features and advantages of the car seat occupancy alarm will be readily apparent to those of ordinary skill in the art upon reading the following detailed description of presently preferred, but nonetheless illustrative, embodiments of the car seat occupancy alarm when taken in conjunction with the accompanying drawings.

In this respect, before explaining the current embodiments of the car seat occupancy alarm in detail, it is to be understood that the car seat occupancy alarm is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the car seat occupancy alarm.

It is therefore important that the claims be regarded as including such equivalent construction insofar as they do not depart from the spirit and scope of the car seat occupancy alarm. It is also to be understood that the phraseology and terminology employed herein are for purposes of description and should not be regarded as limiting.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE EMBODIMENT

Figure 1:
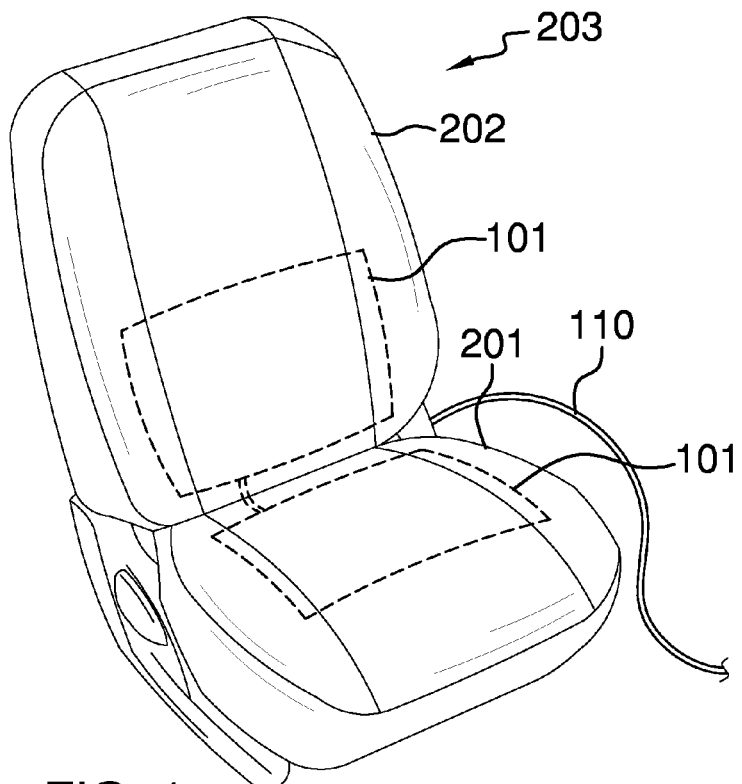
FIG. 1 illustrates a perspective view of the car seat occupancy alarm wherein hidden lines depict the location of sensors on both the seat back as well as the seat.
Figure 2:
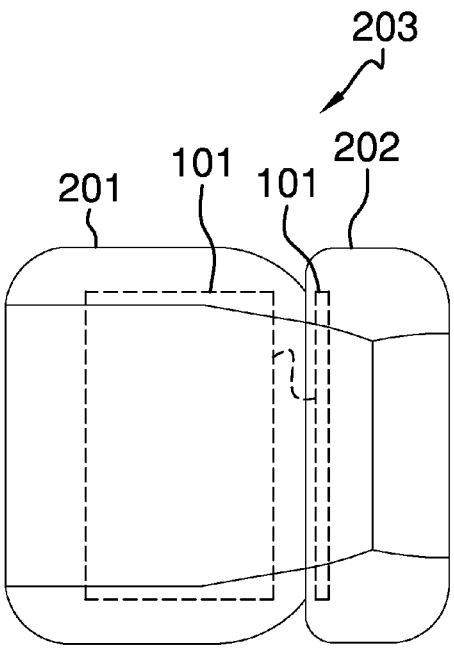
FIG. 2 illustrates a top view of the rear seat.
Figure 3:
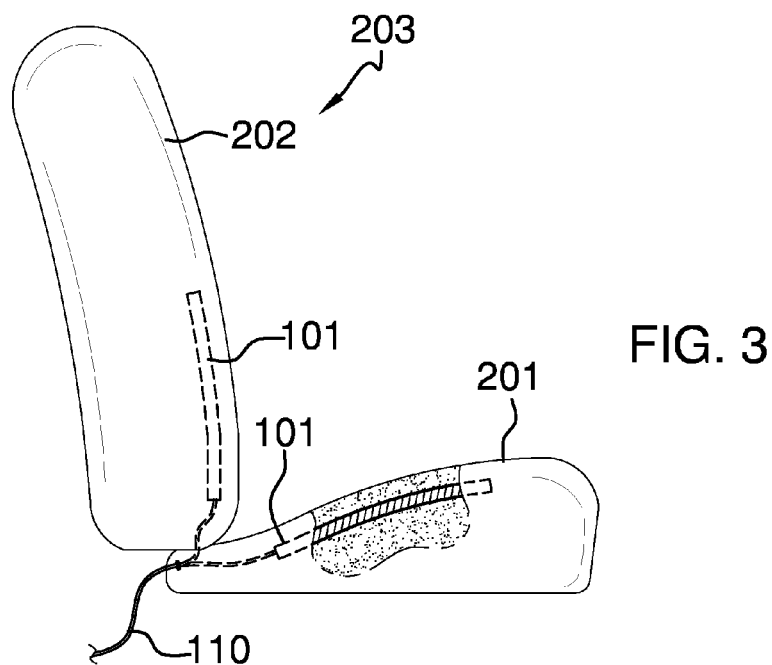
FIG. 3 illustrates a side view of the rear seat.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to the preferred embodiment of the present invention, examples of which are illustrated in FIGS. 1-6. A car seat occupancy alarm 100 (hereinafter invention) includes a plurality of sensors 101 that are integrated into a seat 201 and seat back 202 of a rear vehicle seat 203. The sensors 101 are contact sensors that close a circuit when weight is added in order to detect weight applied thereon. The rear vehicle seat 203 is outfitted with sensors 101 on both the seat 201 and seat back 202 in order to ensure that an individual is actually seated in the rear vehicle seat 203 as opposed to a weighted object being placed thereon.

The sensors 101 are in wired communication via a wire 110 to a central processing unit 120 located elsewhere with respect to a vehicle 200. The central processing unit 120 determines if the sensors 101 detect an individual on the rear vehicle seat 203, and issue an alarm 300 provided the vehicle 200 is turned off.

Figure 5:
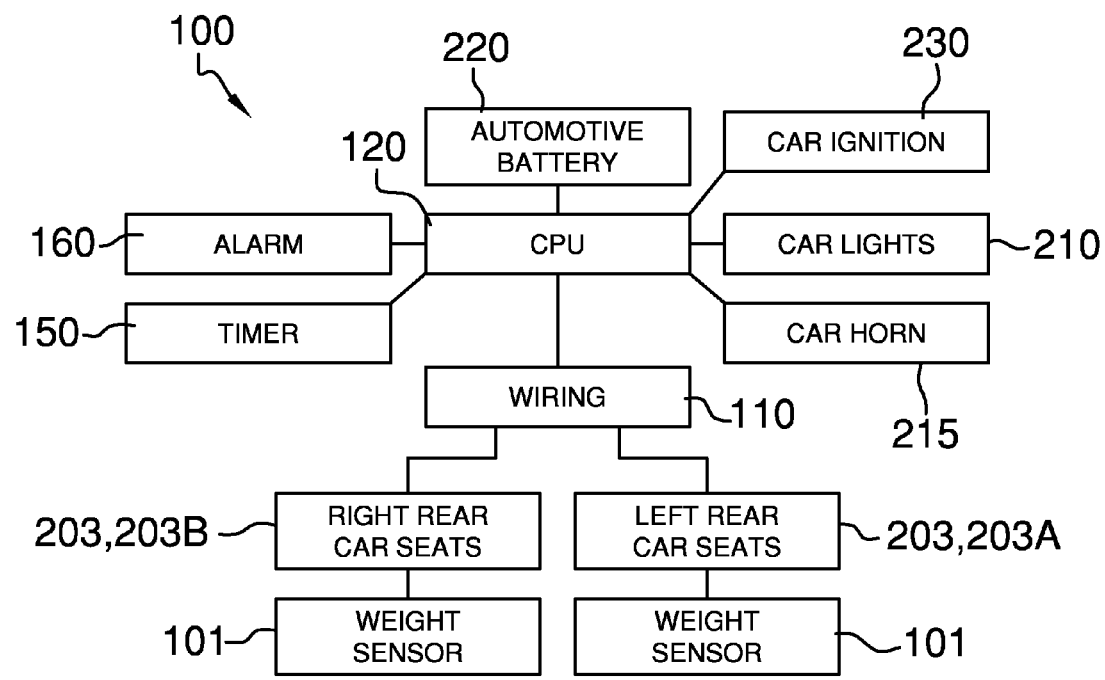
FIG. 5 illustrates a block diagram of the various components of the car seat occupancy alarm.

The central processing unit 120 is referred to as CPU in FIG. 5, and may be referred to as such in the detailed description. The central processing unit 120 is in wired communication with car lights 210, a car horn 215, an automotive battery 220, a car ignition 230, and a timer 150. The timer 150 is included with the invention 100 in order to count down a particular amount of time prior to issuing an alarm 160. The alarm 160 is either audible or visual or a combination of the two. The alarm 160 shall issue a visual alarm via the car lights 210 and shall issue an audible alarm via the car horn 215.

The CPU 120 determines whether the vehicle 200 is running by way of the wired communication between the CPU and a car ignition 230. If the CPU 120 determines that there is/are occupants in either of the rear vehicle seats 203 and that the vehicle 200 is not operating via the car ignition 230, then the timer 150 shall commence to counting down until issuing an alarm 160 via either or both the car lights 210 and car horn 215.

It shall be noted that most vehicles 200 typically have more than one rear vehicle seat. In such a situation, the invention 100 will require sensors 101 on each of the two rear vehicle seats 203. Furthermore, the CPU 120 will be charged with monitoring and detecting the presence of an individual in either of the rear vehicle seats 203, and upon which shall issue the alarm 160.

Figure 4:
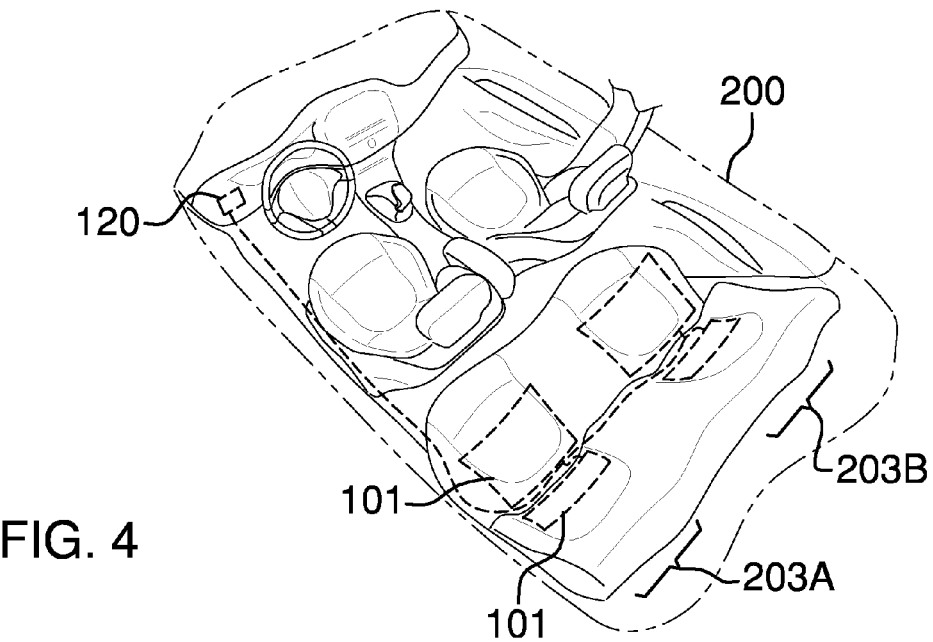
FIG. 4 illustrates a perspective view of the vehicle with both rear seats integrated with sensors that are in wired communication with the central processing unit.

Referring to FIGS. 4-5, the vehicle 200 includes a left rear vehicle seat 203A and a right rear vehicle seat 203B. Moreover, the left rear vehicle seat 203A is individually wired to the CPU 120, whereas, the right rear vehicle seat 203B is wired to the CPU 120 individually.

Figure 6:
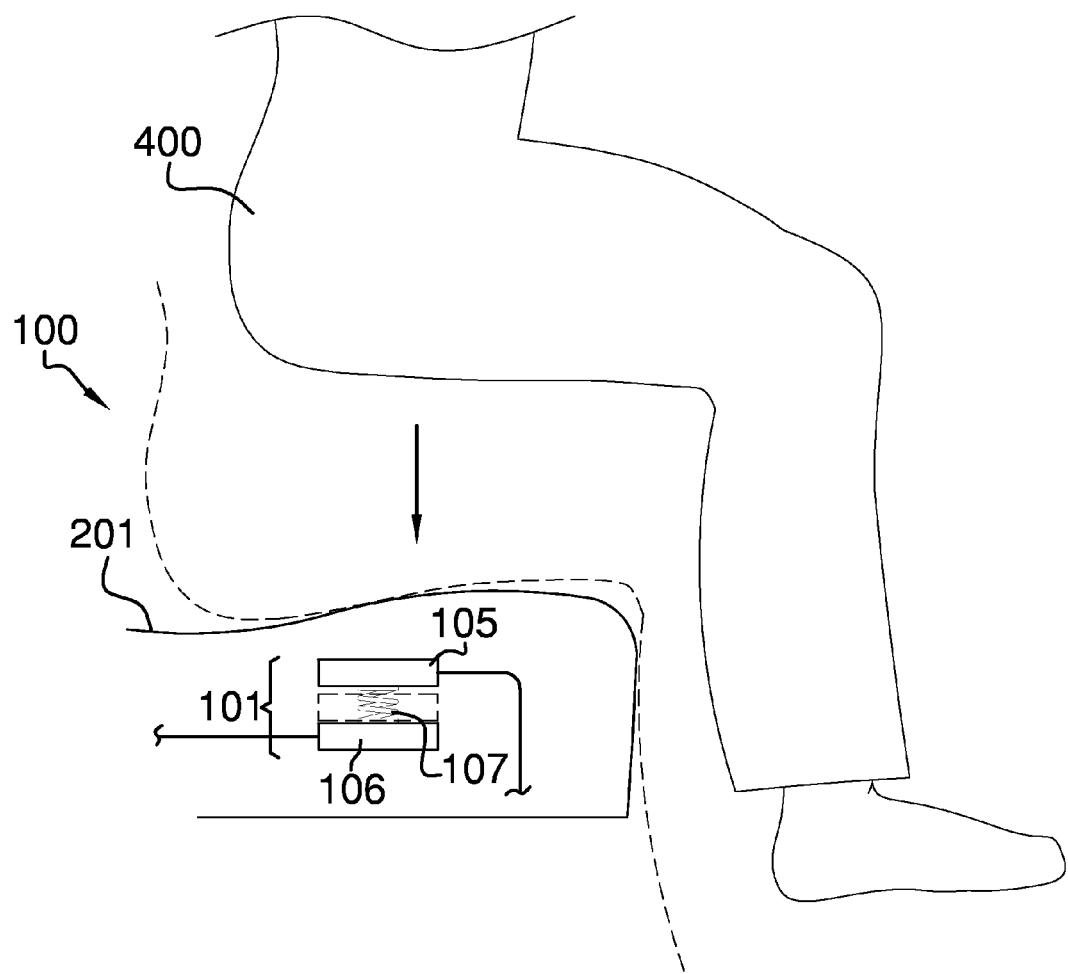
FIG. 6 illustrates another cross-sectional view of the seat of the rear vehicle seat dissecting the componentry associated with the sensor being integrated therein.

Referring to FIG. 6, the sensor 101 is further defined with a first sensor member 105 biased above a second sensor member 106. The first sensor member 105 is biased upwardly with respect to the second sensor member 106 via a spring 107, which when compressed via a weight of an individual 400 shall compress thereby enabling wired communication to occur between the first sensor member 105 and the second sensor member 106.

With respect to the above description, it is to be realized that the optimum dimensional relationship for the various components of the invention 100, to include variations in size, materials, shape, form, function, and the manner of operation, assembly and use, are deemed readily apparent and obvious to one skilled in the art, and all equivalent relationships to those illustrated in the drawings and described in the specification are intended to be encompassed by the invention 100.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A car seat occupancy alarm comprising:
   a plurality of sensors configured for use within a seat and seat back of a rear vehicle seat, which detects a presence of an individual seated thereon;
   wherein the sensors are in wired communication with a central processing unit;
   wherein the central processing unit is configured for wired communication with a car ignition, car lights, automotive battery, car horn of a vehicle;
   wherein the central processing unit shall emit an alarm via car lights and/or car horn upon detection of said individual in said rear vehicle seat while said vehicle is turned off;
   wherein the sensors are contact sensors that close a circuit when weight is added in order to detect weight applied thereon; wherein the rear vehicle seat is outfitted with sensors on both the seat and seat back in order to ensure that said individual is actually seated in the rear vehicle seat as opposed to a weighted object being placed thereon;

wherein a wire connects the sensors to the central processing unit; wherein the central processing unit is wired to a timer, which counts down a particular amount of time prior to issuing said alarm;

wherein the sensor is further defined with a first sensor member biased above a second sensor member; wherein the first sensor member is biased upwardly with respect to the second sensor member via a spring, which when compressed via a weight of said individual shall compress thereby enabling wired communication to occur between the first sensor member and the second sensor member.

2. A car seat occupancy alarm comprising:

a plurality of sensors configured for use within a seat and seat back of a left rear vehicle seat and a right rear vehicle seat, which detects a presence of an individual seated within the respective rear vehicle seat;

wherein the sensors are in wired communication with a central processing unit;

wherein the central processing unit is configured for wired communication with a car ignition, car lights, automotive battery, car horn of a vehicle;

wherein the central processing unit shall emit an alarm via car lights and/or car horn upon detection of said individual in said rear vehicle seat while said vehicle is turned off;

wherein the sensors are contact sensors that close a circuit when weight is added in order to detect weight applied thereon; wherein the rear vehicle seat is outfitted with sensors on both the seat and seat back in order to ensure that said individual is actually seated in the rear vehicle seat as opposed to a weighted object being placed thereon;

wherein the sensor is further defined with a first sensor member biased above a second sensor member; wherein the first sensor member is biased upwardly with respect to the second sensor member via a spring, which when compressed via a weight of said individual shall compress thereby enabling wired communication to occur between the first sensor member and the second sensor member.

3. The car seat occupancy alarm as described in claim 2 wherein a wire connects the sensors to the central processing unit; wherein the central processing unit is wired to a timer, which counts down a particular amount of time prior to issuing said alarm.

* * * * *